United States Patent [19]

Onishi et al.

[11] Patent Number: 5,077,717

[45] Date of Patent: Dec. 31, 1991

[54] SYSTEM FOR DETECTING A CD ON A TRAY IN A COMPACT DISK PLAYER HAVING A MAGAZINE CONTAINING A PLURALITY OF DISKS

[75] Inventors: Sei Onishi; Atsushi Kurosawa; Kiyoshi Morikawa; Kaoru Takemasa; Kiyohito Kajihara; Osamu Kitazawa, all of Saitama, Japan

[73] Assignee: Pioneer Electronic Corporation, Tokyo, Japan

[21] Appl. No.: 616,514

[22] Filed: Nov. 21, 1990

[30] Foreign Application Priority Data

Mar. 7, 1990 [JP] Japan .................................. 2-56059

[51] Int. Cl.⁵ ........................ G11B 17/00; G11B 5/48; G11C 13/04
[52] U.S. Cl. ....................................... 369/36; 369/34; 369/75.2; 369/77.1; 360/92
[58] Field of Search ........................ 369/34, 35, 36, 37, 369/38, 39, 77.1, 77.2, 75.2; 360/99.02, 99.03, 92

[56] References Cited

U.S. PATENT DOCUMENTS

| | | | |
|---|---|---|---|
| 4,498,162 | 2/1985 | Schatteman | 369/77.1 |
| 4,695,995 | 9/1987 | Koizumi | 369/75.2 |
| 4,700,338 | 10/1987 | Sugihara et al. | 369/77.1 |
| 4,969,138 | 11/1990 | Ikedo et al. | 369/36 |

Primary Examiner—Stuart S. Levy
Assistant Examiner—Kenneth B. Wells
Attorney, Agent, or Firm—Armstrong, Nikaido, Marmelstein, Kubovcik & Murray

[57] ABSTRACT

A CD player has a magazine containing a plurality of trays each of which is provided for mounting a CD, and a moving device for moving one of the CDs between the magazine and a playback position. Switches are provided for producing CD position signals each of which represents a CD position on a path of the moving tray, and a photosensor is provided for detecting the CD passing the CD position informed by said CD position signal. A display indicates whether the CD exists on the tray.

5 Claims, 17 Drawing Sheets

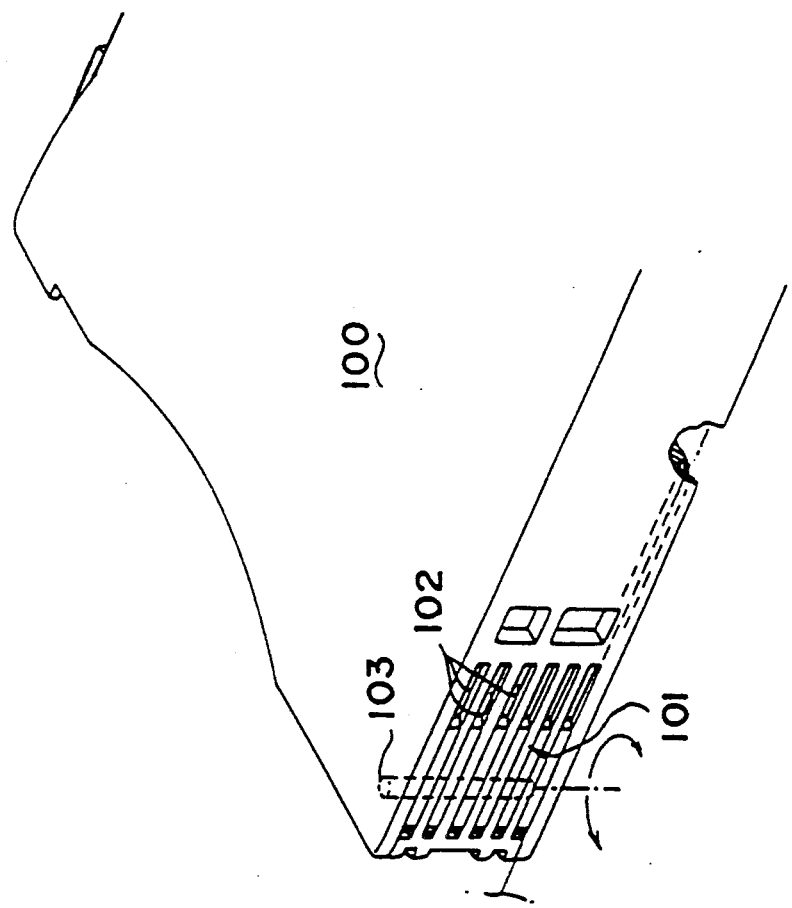

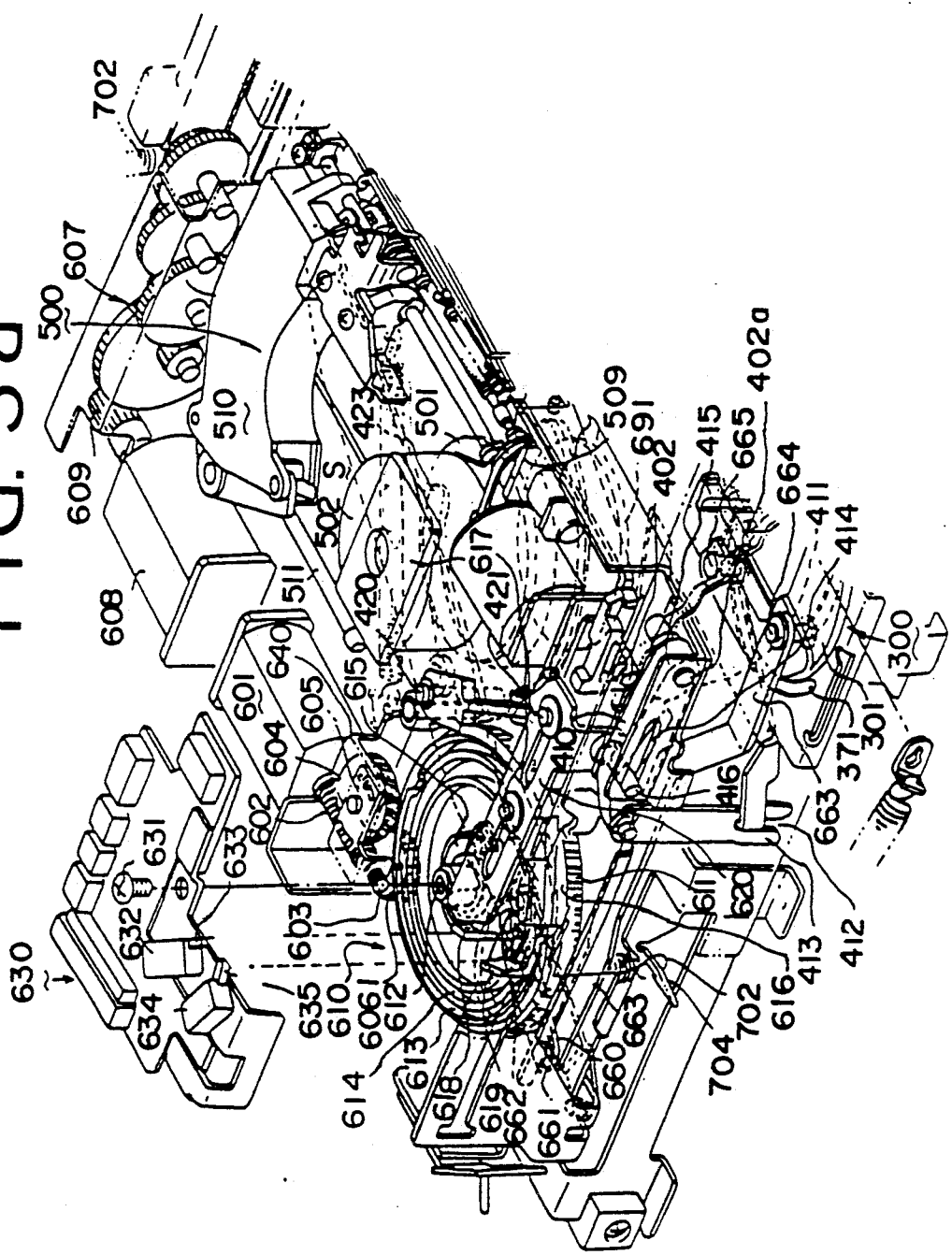

SYSTEM FOR DETECTING A CD ON A TRAY IN A COMPACT DISK PLAYER HAVING A MAGAZINE CONTAINING A PLURALITY OF DISKS

BACKGROUND OF THE INVENTION

The present invention relates to a system for detecting a compact disk (CD) in a CD player which can continuously play a plurality of CDs mounted in a magazine.

The CD player with the magazine has a selecting device for vertically moving the magazine for the purpose of selecting a tray which holds a CD, loading device for loading and unloading the selected tray, a clamping device for clamping a CD on the tray onto a turntable, and a playback device.

A car CD player having such a multiple-CD system is mounted in a trunk of a motor vehicle and operated by a control unit mounted in a driver's room. Consequently, it can not be confirmed whether the selected tray has a CD or not during driving of the motor vehicle. If a tray without a CD is selected, the selection must be repeated after the fact that no CD is mounted on the selected tray is found, which is complicated in operation and inconvenient.

SUMMARY OF THE INVENTION

The object of the present invention is to provide a system which may detect the existence of a CD on a tray, thereby avoiding the repeating of the selection of the tray.

According to the present invention, there is provided a system for detecting a CD on a tray in a CD player having a magazine containing a plurality of trays, a moving device for moving one of the CDs between the magazine and a playback position, the system comprising means for producing CD position signals each of which represents a CD position on a path of the moving tray dependent on the size of the CD mounted on the tray, detector means for detecting the CD passing the CD position informed by the CD position signal and producing a CD signal, and a display for displaying a result of the detection dependent on the CD signal.

In an aspect of the invention, the means for producing CD position signals comprises a cam rotating in synchronism with the moving of the tray and a switch operated by the cam, and the detector means is a photosensor.

The other objects and features of this invention will become understood from the following description with reference to the accompanying drawings.

BRIEF DESCRIPTION OF THE DRAWINGS

FIGS. 2a and 2b show a perspective view of the car CD player and a magazine;

FIGS. 3a and 3b show an exploded perspective view of the car CD player;

DETAILED DESCRIPTION OF THE PREFERRED EMBODIMENT

Figure 1A:
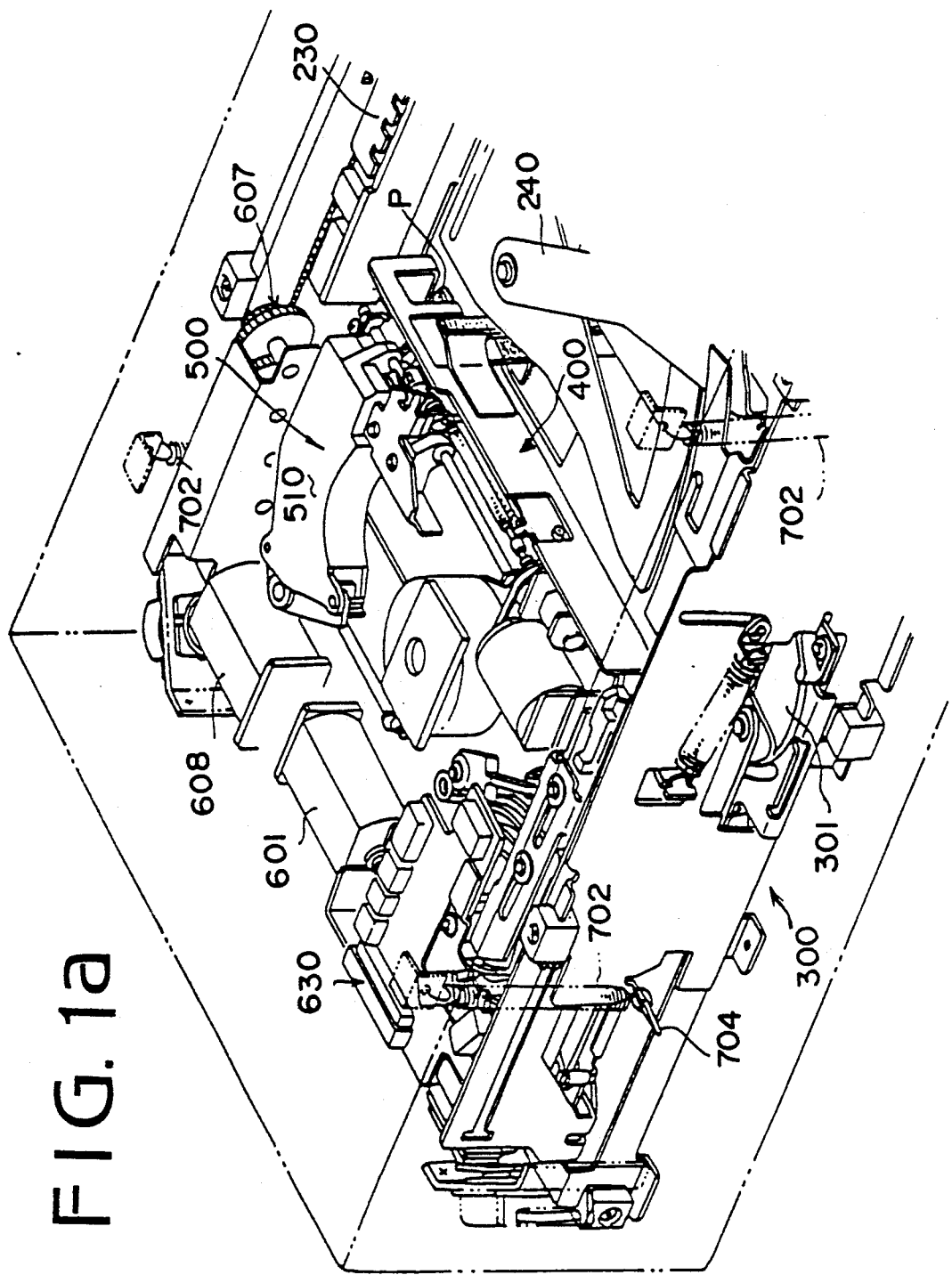
FIGS. 1a and 1b show a perspective view of a whole of a car CD player according to the present invention.
Figure 1B:
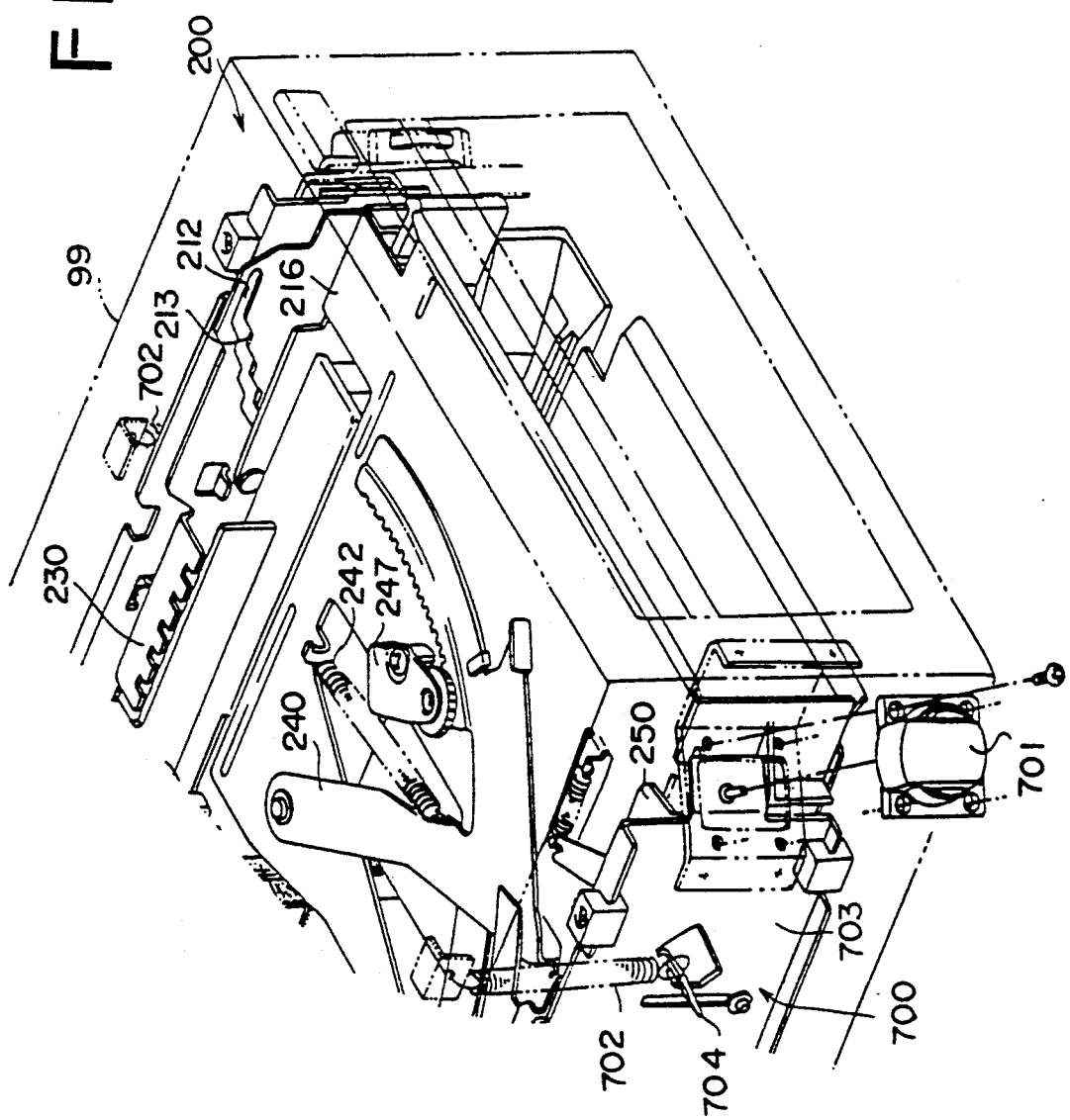
Figure 7:
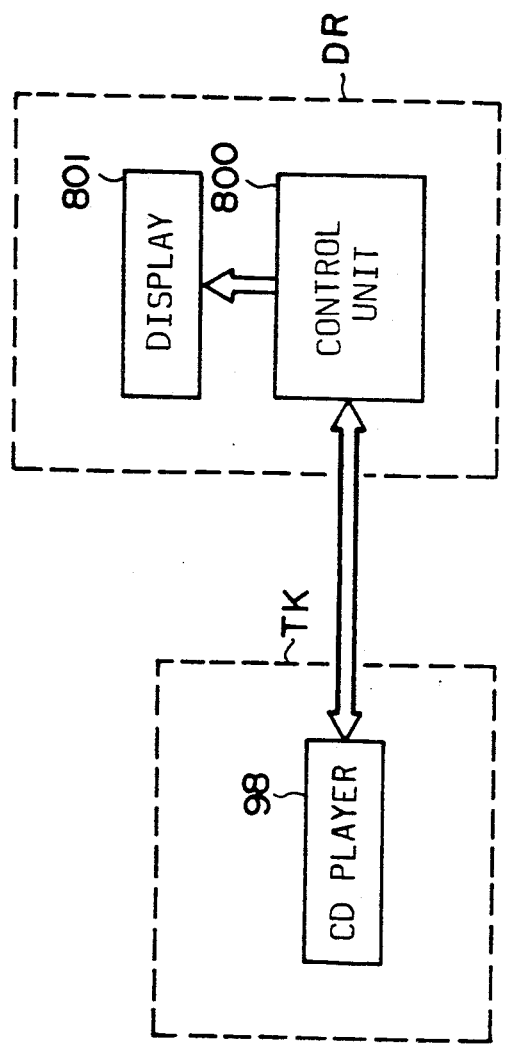
FIG. 7 is a block diagram showing a system for controlling the CD player.
Figure 8:
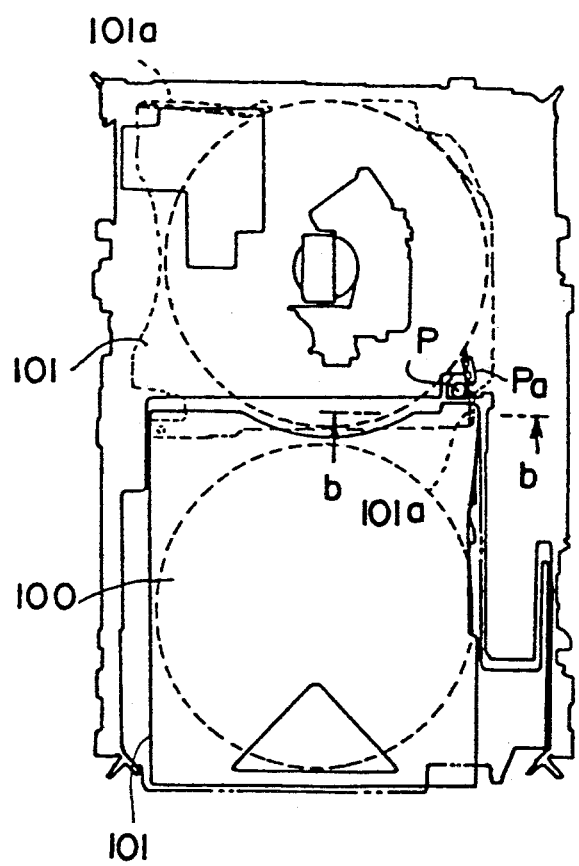
FIG. 8 is a plan view showing a magazine.

Referring to FIG. 7, the car CD player is adapted to be mounted in a trunk TK of a motor vehicle and remotely controlled by operating a control unit 800 mounted in a driver's room DR. Referring to FIG. 1, the CD player comprises a magazine mounting device 200 having a magazine holder 216 for mounting a magazine 100 (FIG. 2), a loading device 300 for loading a selected tray in the magazine, a clamp device 400 for removing a CD from the tray and clamping it to a turntable, and a reproducing device 500 having a pickup 510. These components are housed in a frame 700 supported in a casing 99 through dampers 701 and damping springs 702. A spring retainer 704 for the damping spring 702 is projected at 45 degrees from each side plate 703 of the frame 700.

Figure 2A:
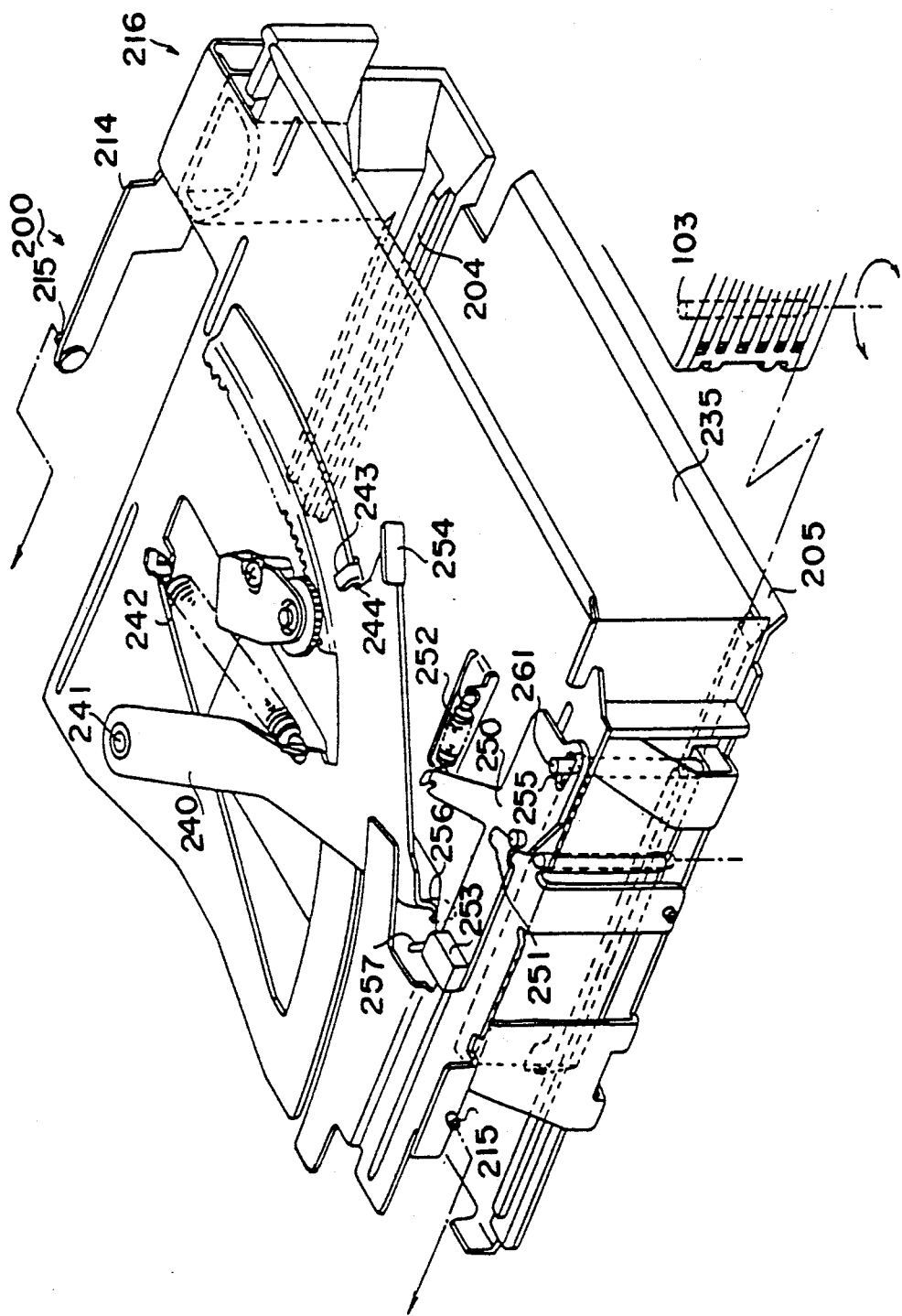
Figure 4:
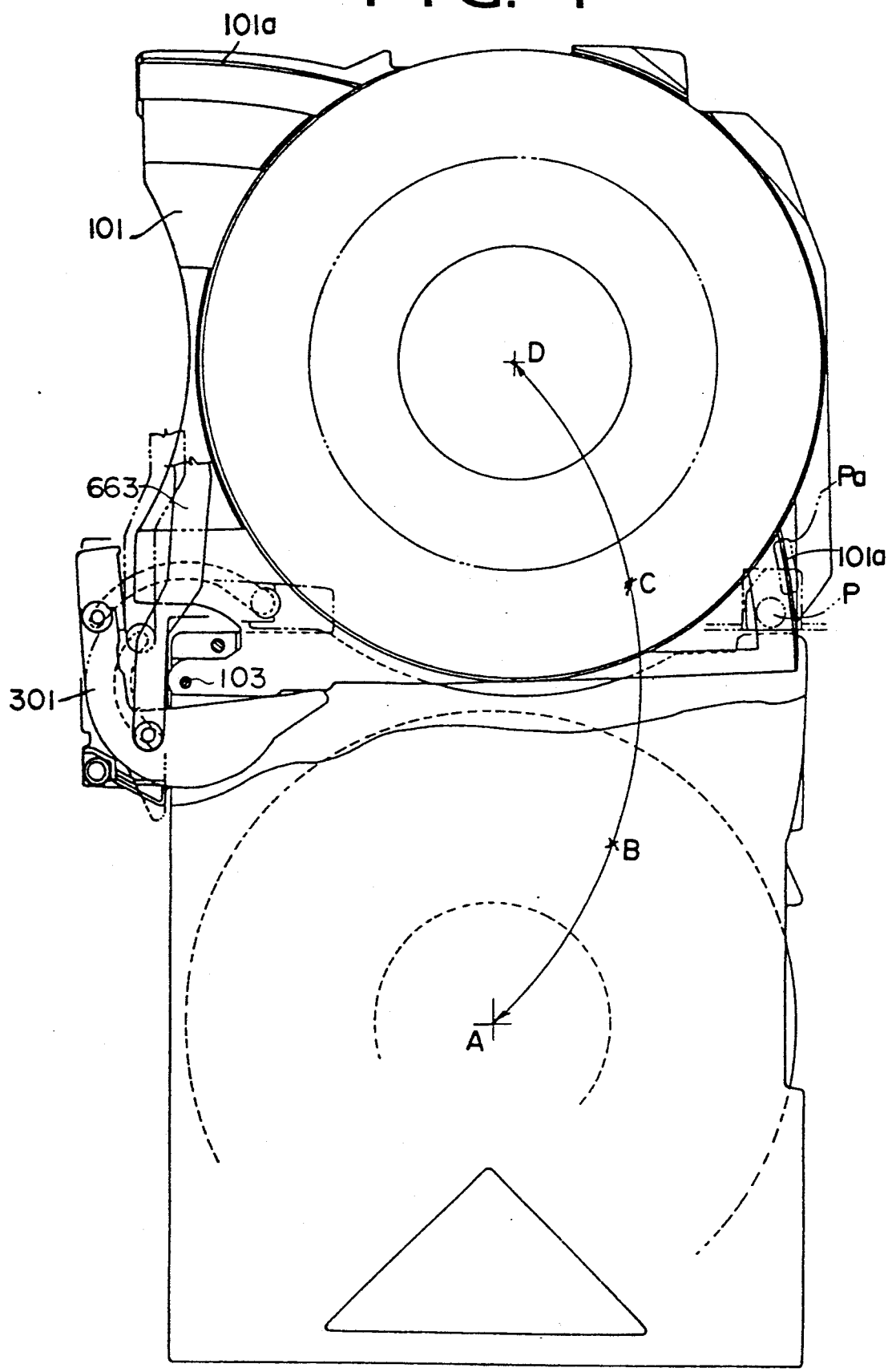
FIG. 4 shows a device for moving a tray mounting a CD between the magazine and a playback position.

Referring to FIGS. 2 and 4, a plurality of trays 101 are housed in the magazine 100. The magazine has openings 102 at a side thereof, corresponding to the trays. A loading lever 301 of the loading device 300 engages with one of the trays 101 through the opening 102, and causes it to rotate about an axis 103 (as shown by an arrow) to a playback position D in the player.

Figure 3B:
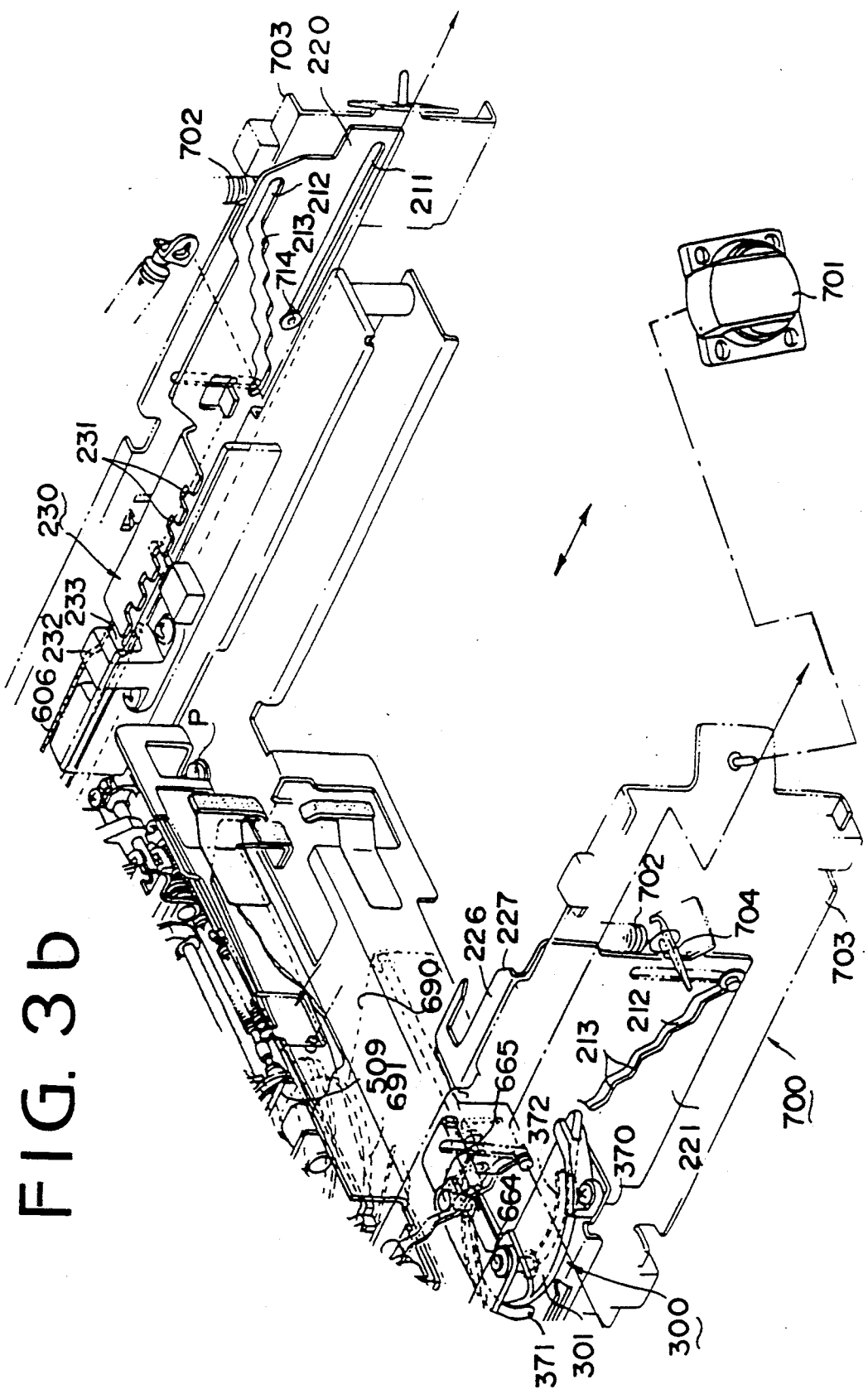
Figure 5:
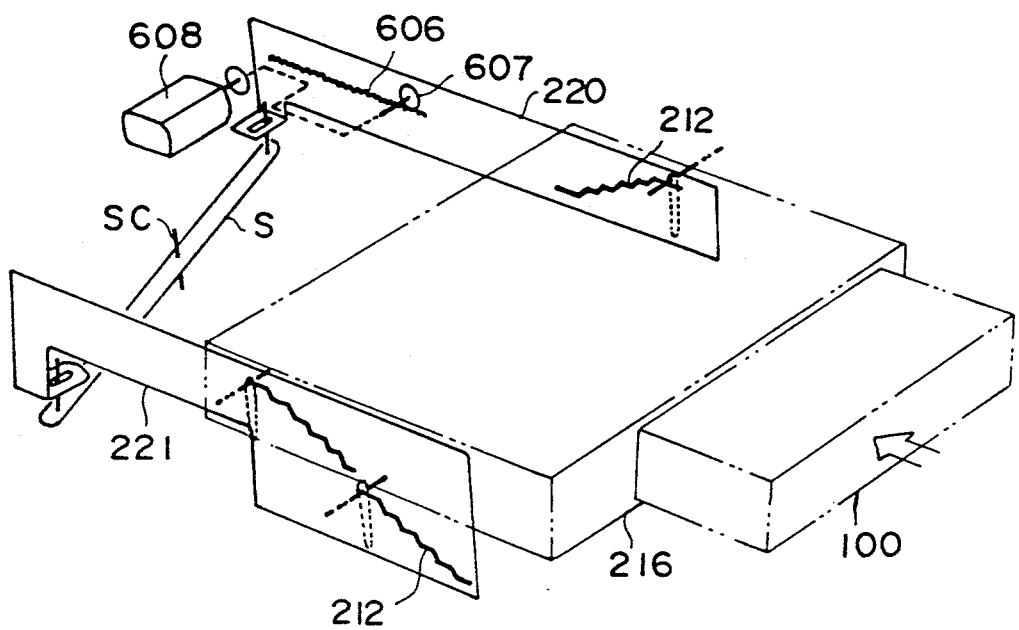
FIGS. 5 and 6 are perspective views showing a magazine holder elevating device.
Figure 6:
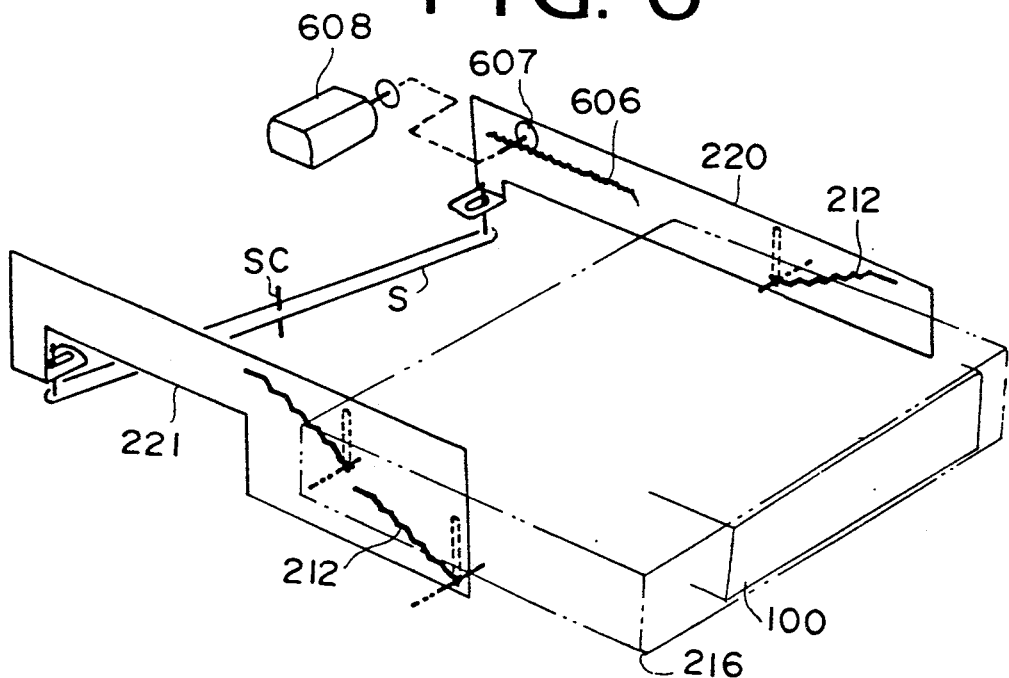

Referring to FIGS. 3, 5 and 6, slide plates 220 and 221 are slidably mounted on inside walls of the side plates 703, respectively. Each slide plate has a guide groove 211 with which a pin 714 on the side plate 703 is slidably engaged so as to guide the slide plate in the longitudinal direction. Both slide plates are connected by a lever S as shown in FIG. 5. The lever S is pivotted at a central portion SC, so that both slide plates are moved in the opposite directions. Each slide plate has a stepwise supporting groove 212 having a plurality of steps 213.

The number of the steps is the number of the CD stored in the magazine, that is six in the embodiment. In each groove, a pin 215 provided on a projection 214 projected from the magazine holder 216 is slidably engaged. Both the supporting grooves 212 are inclined in the opposite directions, so that the magazine holder 216 is vertically moved when the slide plates 220 and 221 move in the opposite directions.

On the slide plate 220, a position detector plate 230 having six slits 231 is formed, corresponding to the vertical position of the magazine holder.

A photosensor 232 is provided to detect the position of one of the slits 231, that is the position of the CD to be played.

The slide plate 220 has a rack 606 on an upper edge thereof, with which an end gear of a gear train 607 engages. The other end gear 609 of the gear train 607 is secured to a rotating shaft of a motor 608 mounted on the frame 700.

On the magazine holder 216, a swing lever 240 having a magazine abutting end 256 and a switch operating end 254 are pivotally mounted by a pin 241. The lever 240 is urged by a spring 242, so that an end 244 is abutted to a projection 243.

A lever 250 is pivotally mounted on the magazine holder 216, pivotted by a pin 251. The lever 250 is urged by a spring 252, abutting a side of an elongated hole 255 formed therein on a pin 261. A switch 253 is mounted on the lever 250 so that an actuating lever 257 thereof is operated by the switch operating end 254.

The magazine holder 216 has an opening 205 for receiving the magazine 100 and a bottom 235. On the bottom 235, an elongated plastic guide 204 is attached at an entrance zone of the magazine holder.

A motor 601 is mounted on the frame 700 for driving various mechanism. Securely mounted on a rotating shaft of the motor 601 is a worm 602 which is engaged with a worm wheel 604 rotatably mounted on a supporting plate 640. A thrust screw 603 is mounted on the plate 640 so as to receive the thrust of the worm 602. By rotating the screw 603, the gap between the screw and the end of the worm is adjusted.

The worm wheel 604 operatively connected through gears 605 and 6061 to a teeth 611 formed on a periphery of a disk cam 610 so as to rotate the cam.

Figure 10:
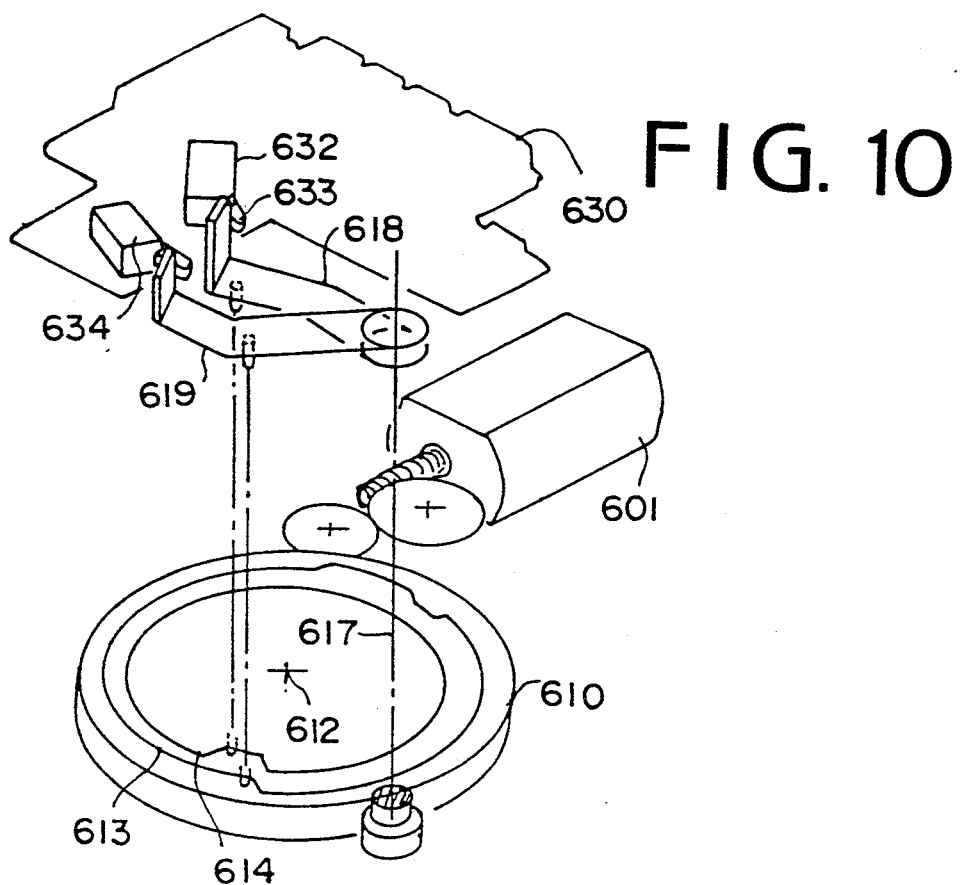
FIGS. 10 and 11 are perspective views showing cam operated switches.
Figure 11:
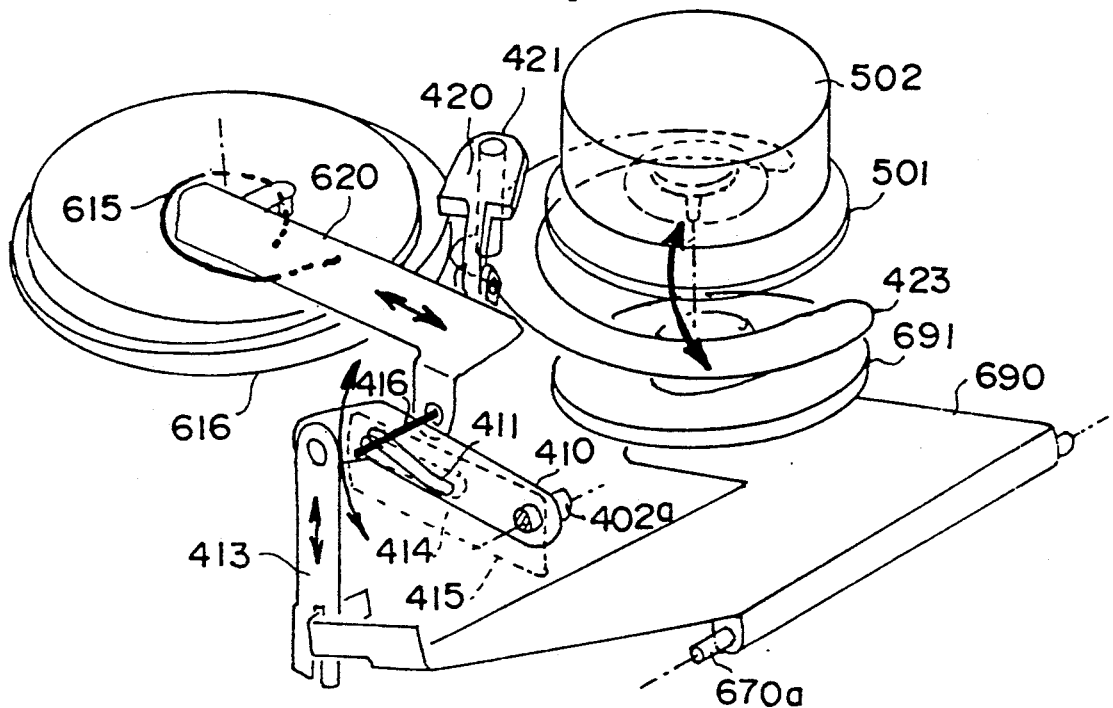

Referring to FIGS. 10 and 11, the disk cam 610 is pivotally mounted on a shaft 612 and has three cam grooves 613, 614 and 615, and a projected cam 616. A pair of levers 618 and 619 pivotted on a pin 617 engage with the cam grooves 613 and 614 at engaging ends, respectively. Engaged with the cam groove 615 is a slide lever 620 having an engaging pin 416 and provided to be moved by the cam groove in the longitudinal direction of the player.

Above the cam 610, a substrate 630 is secured to the shaft 612 by a screw 631. On the substrate 630, a tray position detecting switch 632 and a CD position detecting switch 634 are mounted. The switches 632 and 634 are adapted to be operated by the levers 618 and 619.

When the tray 101 is in the magazine 100 (position A of FIG. 4), the cam 610 is at an initial position where the lever 618 engages with an operating lever 633 of the tray position detecting switch 632 to render the switch 632 operative. When the cam 610 starts to rotate for loading the CD, the lever 618 separates from the lever 633 to cause the switch to be in an inoperative state. When the CD is clamped on a turntable as described hereinafter (position D of FIG. 4), the lever 618 engages with the lever 633 to operate the switch again. Namely, the switch 632 produces output signals when the CD is at the position A in the magazine and at the clamping position D, and when CD starts to move from the magazine and from the clamping position.

On the other hand, the lever 619 engages with an operating lever 635 to operate the CD position detecting switch 634 when the center (A) of the tray 101 reaches a large disk position B of FIG. 4, where a large disk position signal is produced. When the tray reaches a large/small disk position C, the switch 634 is operated again to produce a large/small disk position signal.

Figure 12:
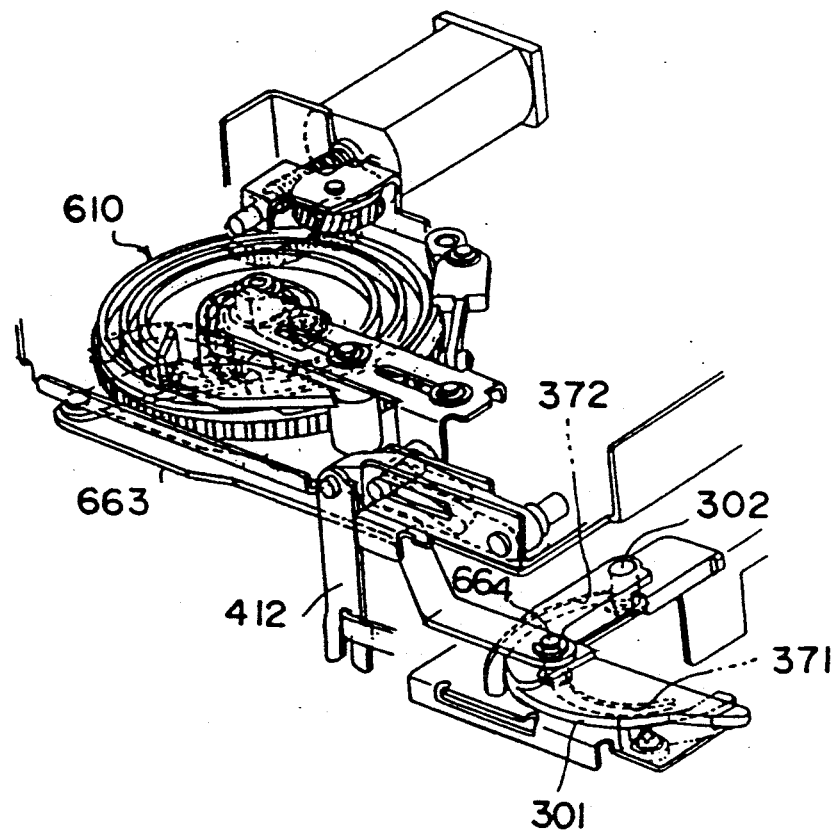
FIGS. 12 to 14 are perspective views showing a tray loading device.
Figure 13:
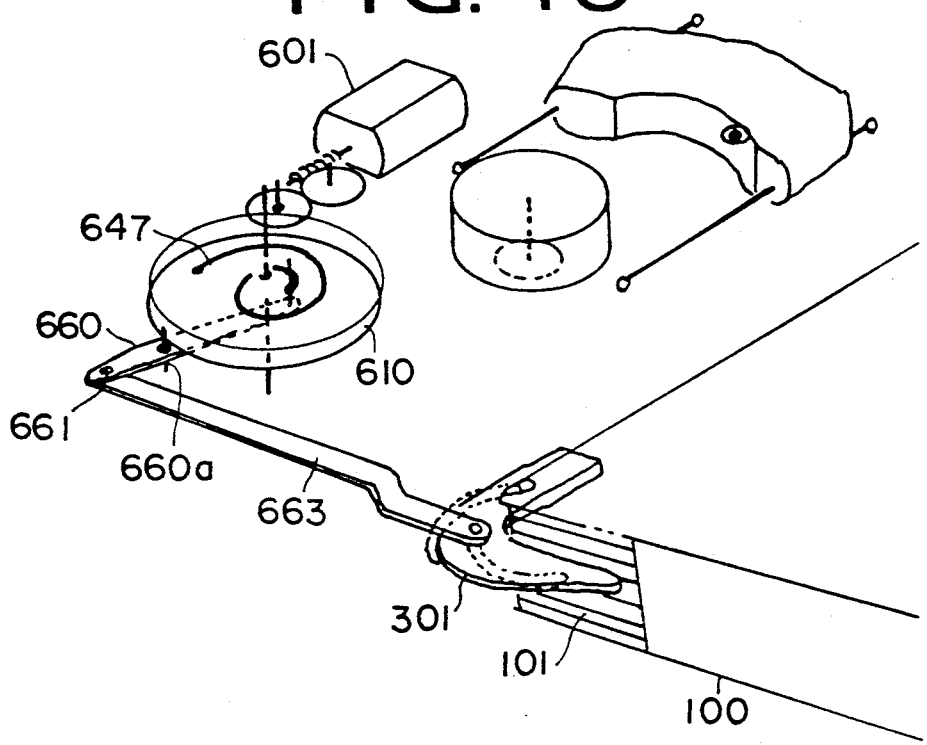
Figure 14:
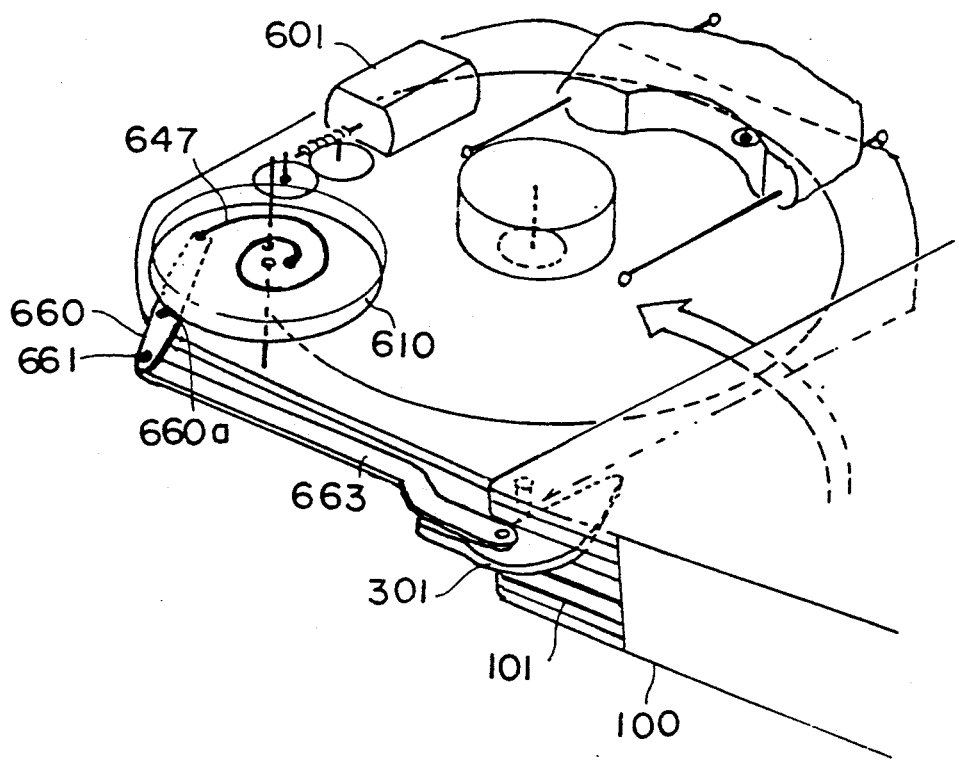

Referring to FIGS. 12 to 14, on the underside of the cam 610, a cam groove 647 is provided for loading the tray 101. An end of a lever 660 pivotted at 660a is slidably engaged with the cam groove 647, and the other end of the lever is connected to an end of a connecting link 663 by a pin 661. The other end of the link 663 is connected to the loading lever 301 by a pin 664.

Figure 15:
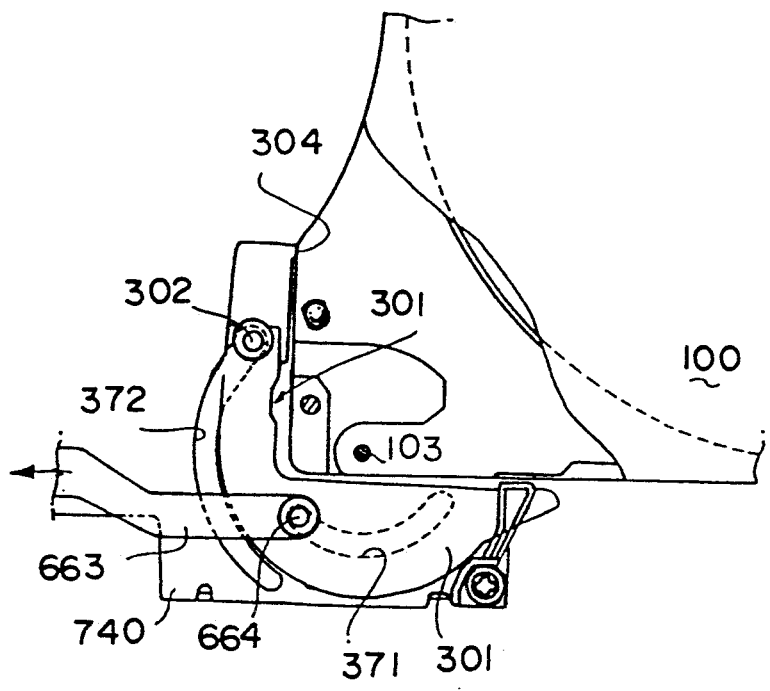
FIGS. 15 and 16 are plan views showing the tray loading device.
Figure 16:
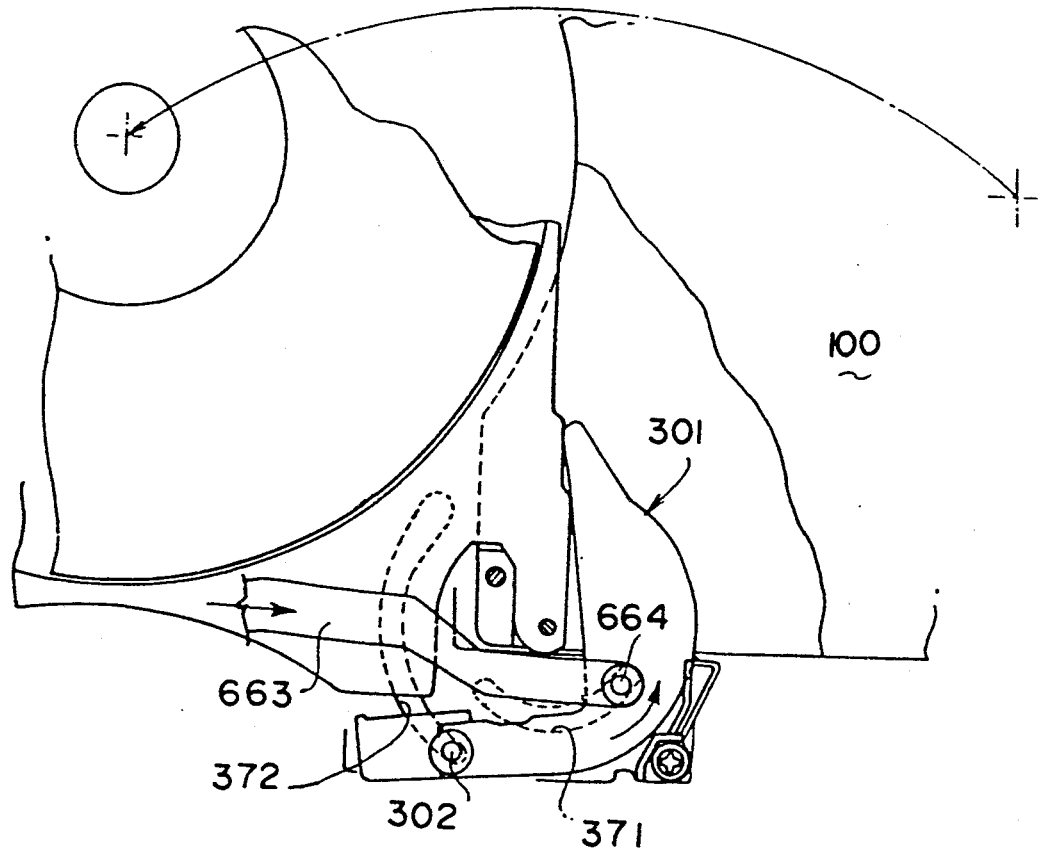

Referring to FIGS. 15 and 16, the loading lever 301 is pivotally mounted on a pin 302 which is slidably engaged with an arcuated slit 372 formed in a frame 740.

On the other hand, the pin 664 is slidably engaged with an arcuated slit 371. Both the slits 372 and 371 have arcs with respect to the axis 103. A cam 308 is provided on the frame 740 for guiding the loading lever 303. The lever 303 has a positioning end 304 for positioning the tray 101 in the magazine 100 at the position of FIG. 13.

When the cam 610 rotates in the clockwise direction, the link 663 is moved forward (in the direction to the front part of the player) to turn the loading lever 303 in the counterclockwise direction along the slits 371 and 372.

In an early period, the pin 302 does not move, but only the pin 664 moves, so that the loading lever 301 is turned, guided by the cam 308 on the periphery thereof. Thus, the lever 303 is moved from the position of FIG. 15 to the position of FIG. 16, so that one of trays 101 is pivoted about the axis 103 to the loading position. When unloading the tray, the cam 610 is reversely rotated, so that the loading lever 301 is turned in the reverse direction. The end 304 pushes the tray, thereby turning the tray into the magazine.

Figure 17:
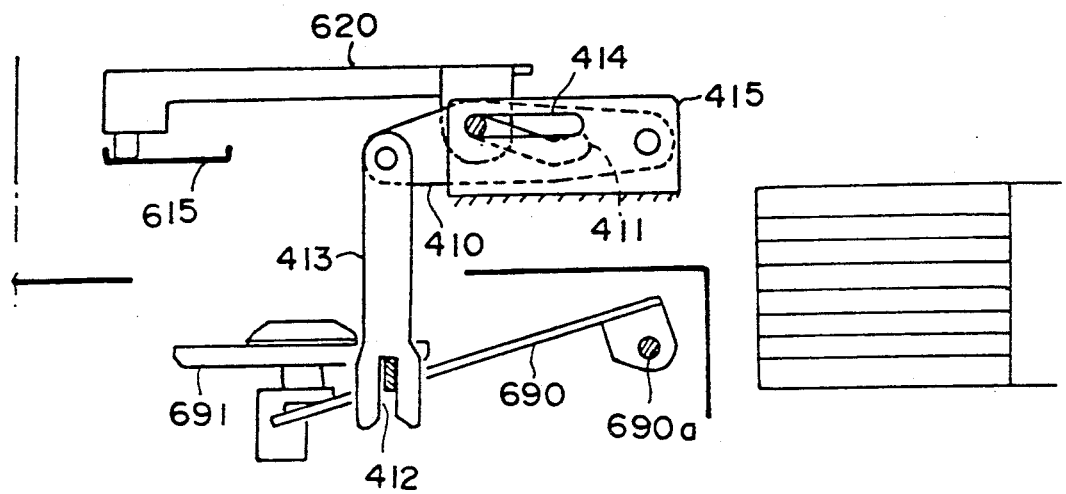
FIGS. 17 and 18 are side views showing cam operated switches.
Figure 18:
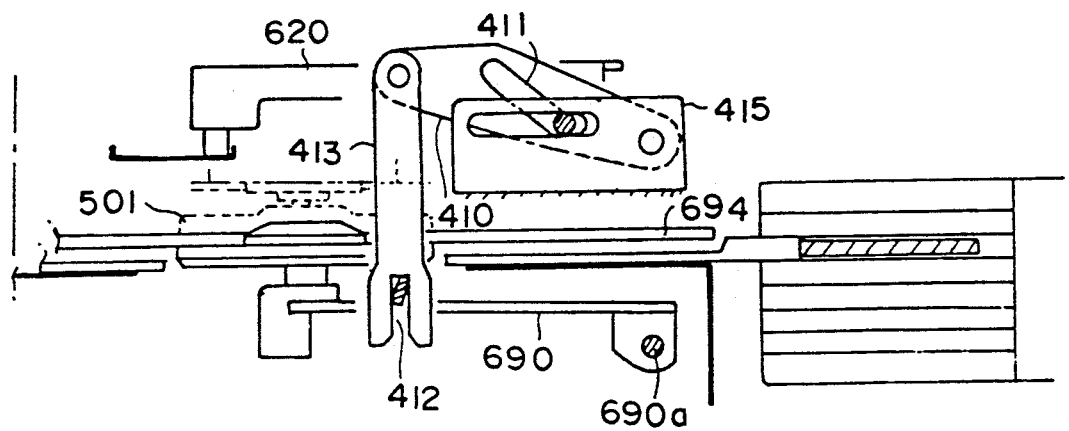

Referring to FIGS. 11, 17 and 18, the engaging pin 416 of the slide lever 620 slidably engages with a horizontal slit 414 of a guide plate 415 and slidably engages with an inclined slit 411 of a lever 410 which is pivotted on a pin 402a. The lever 410 is connected to a vertical lever having an end slit 412 which is engaged with an end of a clamping arm 690. The clamping arm 690 is pivotally mounted on a shaft 690a at an end and connected to a CD clamper 691 at the other end.

When the slide lever 620 is forwardly moved by the cam groove 615, the lever 410 is pivotted in the clockwise direction to elevate the lever 413. Following the lever 413, the arm 690 is upwardly pivotted by a spring (not shown), so that the clamper 691 clamps a CD 694 on the tray 101 projected from the magazine 100 on a turntable 501. The turntable 501 is rotated by a motor 502.

Figure 19:
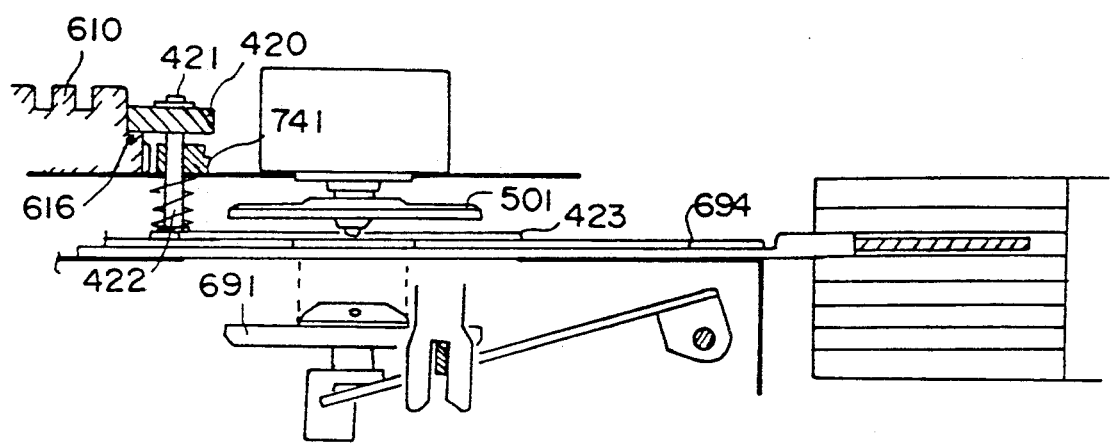
FIGS. 19 and 20 are side views showing a part of a turntable.
Figure 20:
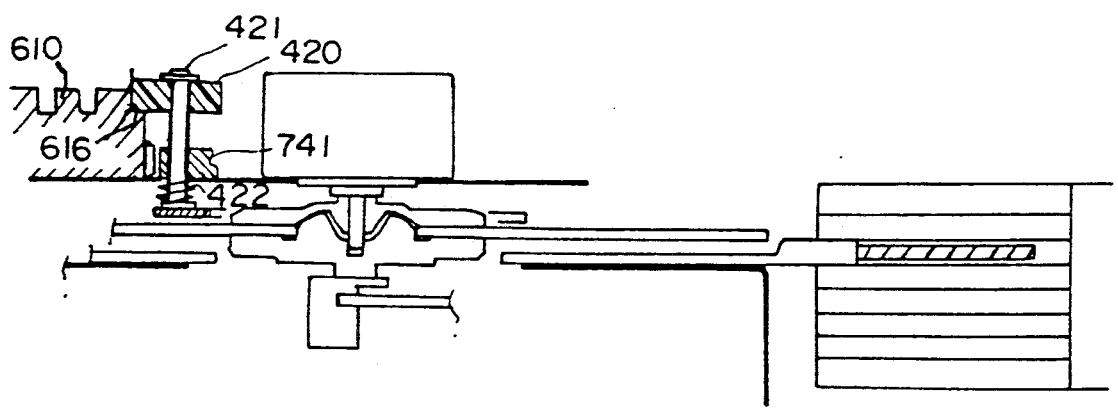

Referring to FIGS. 19 and 20, on the cam 616, a cam follower 420 is slidably mounted. The cam follower 420 is secured to a CD backup lever 423 through a shaft 421 which is slidably mounted in a frame 741. The cam follower is urged to the cam 616 by a spring 422.

When the cam 616 rotates, the cam follower 420 is vertically moved, thereby moving the lever 423, keeping a gap between the lever and the CD. When the CD 694 is clamped on the turntable 501 by the clamper 691, the lever 423 is upwardly moved as the clamper moves. When the CD is removed, the lever 423 is lowered by the cam 616.

Figure 21:
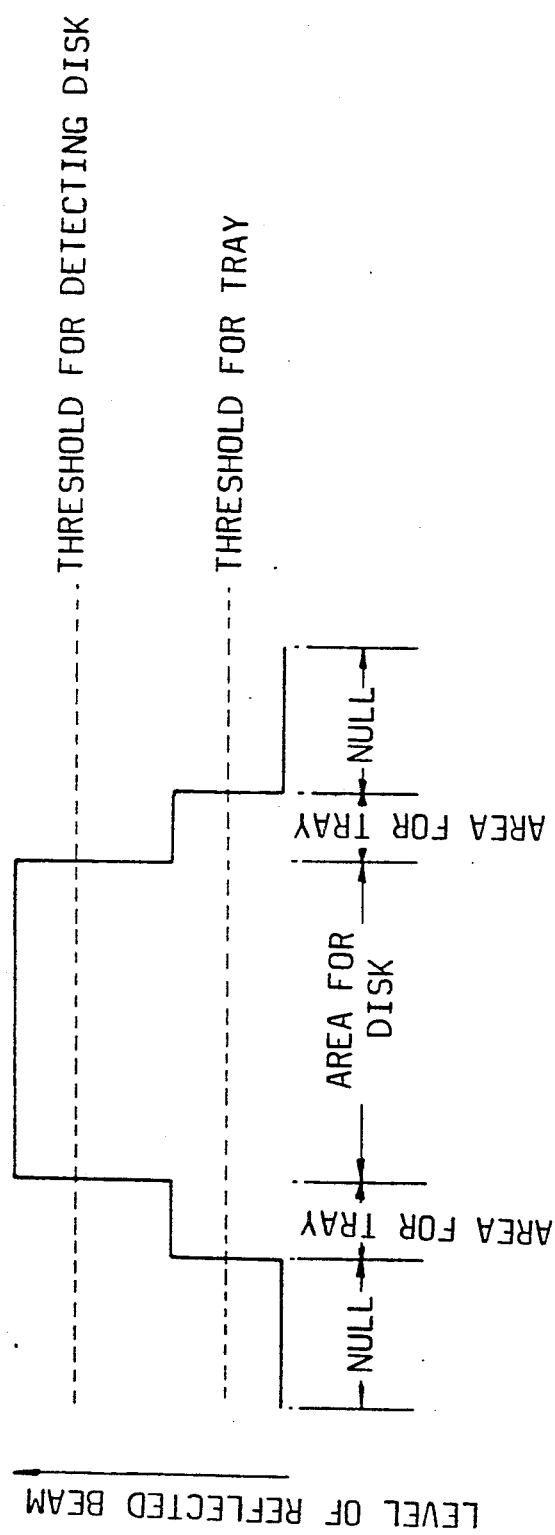
FIG. 21 is a graph showing output of a photosensor.

Referring to FIG. 4, a photosensor P is provided adjacent the tray 101 at the playing position for detecting the existence of the tray. As shown in FIG. 21, the photosensor P produces an output signal having various level according to the level of the reflected beam from the CD and the tray. From the level, the removal of the CD from the turntable can be detected.

Figure 9:
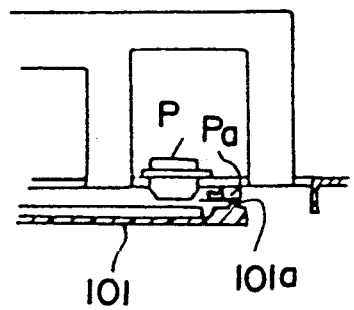
FIG. 9 is a sectional view take on line b—b of FIG. 8.

As shown in FIGS. 4 and 9, a height restricting member Pa is provided adjacent the photosensor P so as to engage with a rib 101a of the tray 101, thereby keeping the tray at a set position with respect to the photosensor P.

The output signals of the photosensor P, the tray position detecting switch 632 and CD position detecting switch 634 are applied to the control unit 800 shown in FIG. 7.

In operation, the pins 215 of the magazine holder 216 engage with the uppermost steps 213, so that the magazine holder is held at the uppermost position before the playback. The magazine 100 is inserted into the magazine holder 216 from the inlet 205 by hand. The side of the magazine abuts on the end 256 of the swing lever 240 to pivot the lever in the clockwise direction against the spring 242. At the terminal end, the switch operating end 254 engages with the actuating lever 257 of the switch 253, thereby producing a signal representing the completion of the charging or loading of the magazine 100 in the magazine holder 216.

The user operates a CD select switch provided on the dashboard of the car, so that the motor 608 starts to rotate the gear train 607. Thus, the slide plate 220 is forwardly moved and the slide plate 221 is rearwardly moved backward to lower the magazine holder 216 to a desired position dependent on the selection of the CD. The desired position is detected by the output signal of the photosensor 232 detecting the slits 231 of the position detector plate 230.

Thereafter, the motor 601 starts to rotate the cam 610 in the clockwise direction. As described above, the link 660 and the loading device 300 are operated to move the tray 101 of the selected CD to the playback position.

When the tray 101 reaches the large/small disk position C of FIG. 4, the control unit 800 reads the output signal of the photosensor P. Thereafter, the motor 601 is reversed to back the tray to the large disk position B. When it is detected that either of a large CD (12 cm in diameter) or a small CD (8 cm in diameter) is mounted on the tray 101, at the position C, and the photosensor P further detects the CD at the position B, it is determined that a large CD is mounted on the tray. When the CD is detected at the position C and is not detected at the position B, it is determined that the CD on the tray is a small CD.

The result of the detection that is, the presence of a large CD or a small CD, is indicated on a display 801 (FIG. 7). If no disk is detected at both positions C and B, the tray is returned to the magazine 100. When an annular adapter for mounting the small CD is attached on the tray for the large CD, the adapter is detected at only position B.

Thus, the existence of the adapter can be detected and the tray is returned to the magazine. If the tray having the adapter is loaded, it may occur that the adapter is caught by a member in the player in the unloading operation. If the adapter stays in the player, the subsequent CD can not be reproduced. In accordance with the system of the invention, such a problem is prevented.

When a play key is operated, the selected tray is moved to the playback position D, and then the CD is removed from the tray by the arm 690 and the clamper 691 and clamped on the turntable 501 by the clamper 691 (FIG. 18). Therefore, the motor 502 is driven to rotate the CD, thereby playing the CD.

When the playing of the CD finishes, the motor 601 operates in reverse to rotate the cam 610 in the counterclockwise direction. Thus, the clamper 691 is lowered, so that the CD is released from the turntable 501 and put on the tray 101. At that time, the CD backup lever 423 is slightly lowered to depress the CD, so that the CD is exactly fitted in the groove 101a of the tray 101.

In accordance with the present invention, since the existence of the CD on the tray can be detected, it is not necessary to repeat the selection of the tray, whereby the operation of the CD player is simplified.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for detecting a CD on a tray in a CD player having a magazine containing a plurality of trays, a moving device for moving one of the trays between the magazine and a playback position, the system comprising:
    means for producing CD position signals each of which represents a CD position on a path of the moving tray dependent on the size of the CD mounted on the tray;
    a sensor for detecting a CD passing said CD position informed by said CD position signal and for producing a CD signal dependent on the size of the CD when a CD is detected at least one of the CD positions; and
    a display for displaying a result of the detection dependent on the CD signal.

2. The system according to claim 1, wherein
    said means for producing CD position signals comprises a cam rotating in synchronism with the moving of the tray and a switch operated by the cam.

3. The system according to claim 1, wherein
    said sensor is a photosensor.

4. The system according to claim 1, wherein
    said size of the CD comprises a large CD size and a small CD size.

5. The system according to claim 1, wherein
    said CD position includes a position dependent on the size of an adapter for a small CD.

* * * * *